United States Patent [19]

Bakken et al.

[11] 4,136,032
[45] Jan. 23, 1979

[54] LIQUID TREATMENT APPARATUS

[75] Inventors: Daniel A. Bakken, White Bear Lake; Robert A. Henderson, Rosemount; Edward J. Tischler, St. Paul, all of Minn.

[73] Assignee: Ecodyne Corporation, Lincolnshire, Ill.

[21] Appl. No.: 864,063

[22] Filed: Dec. 23, 1977

[51] Int. Cl.$^2$ ............................................. B01D 23/24
[52] U.S. Cl. ..................................... 210/278; 210/138; 210/141; 210/424; 137/599.1; 137/625.29
[58] Field of Search ................. 210/98, 109, 110, 117, 210/121, 130, 134, 137, 138, 141, 142, 143, 190, 191, 194, 259, 260, 269, 275, 277, 278, 424, 30 R, 31 R, 32, 34; 137/599.1, 625.29

[56] References Cited

U.S. PATENT DOCUMENTS

| | | | |
|---|---|---|---|
| 2,613,056 | 10/1952 | Hughes | 137/625.29 |
| 2,768,950 | 10/1956 | Kryzer et al. | 210/177 X |
| 3,177,899 | 4/1965 | Anderson et al. | 137/625.29 |
| 3,480,041 | 11/1969 | Whitlock | 137/625.29 |
| 3,976,101 | 8/1976 | Bassett | 210/138 X |

FOREIGN PATENT DOCUMENTS

| | | | |
|---|---|---|---|
| 2549132 | 5/1977 | Fed. Rep. of Germany | 210/424 |
| 1345113 | 10/1963 | France | 210/424 |

Primary Examiner—Ferris H. Lander
Attorney, Agent, or Firm—Charles M. Kaplan; Joel E. Siegel

[57] ABSTRACT

A flow control valve for multicycle liquid treatment apparatus has a pair of rotatable, slotted circular discs at its opposite ends. Rotation of the discs causes the slots to be selectively aligned with various ports, passages, holes and channels so as to control the direction and duration of liquid flow during the different cycles of the apparatus.

19 Claims, 30 Drawing Figures

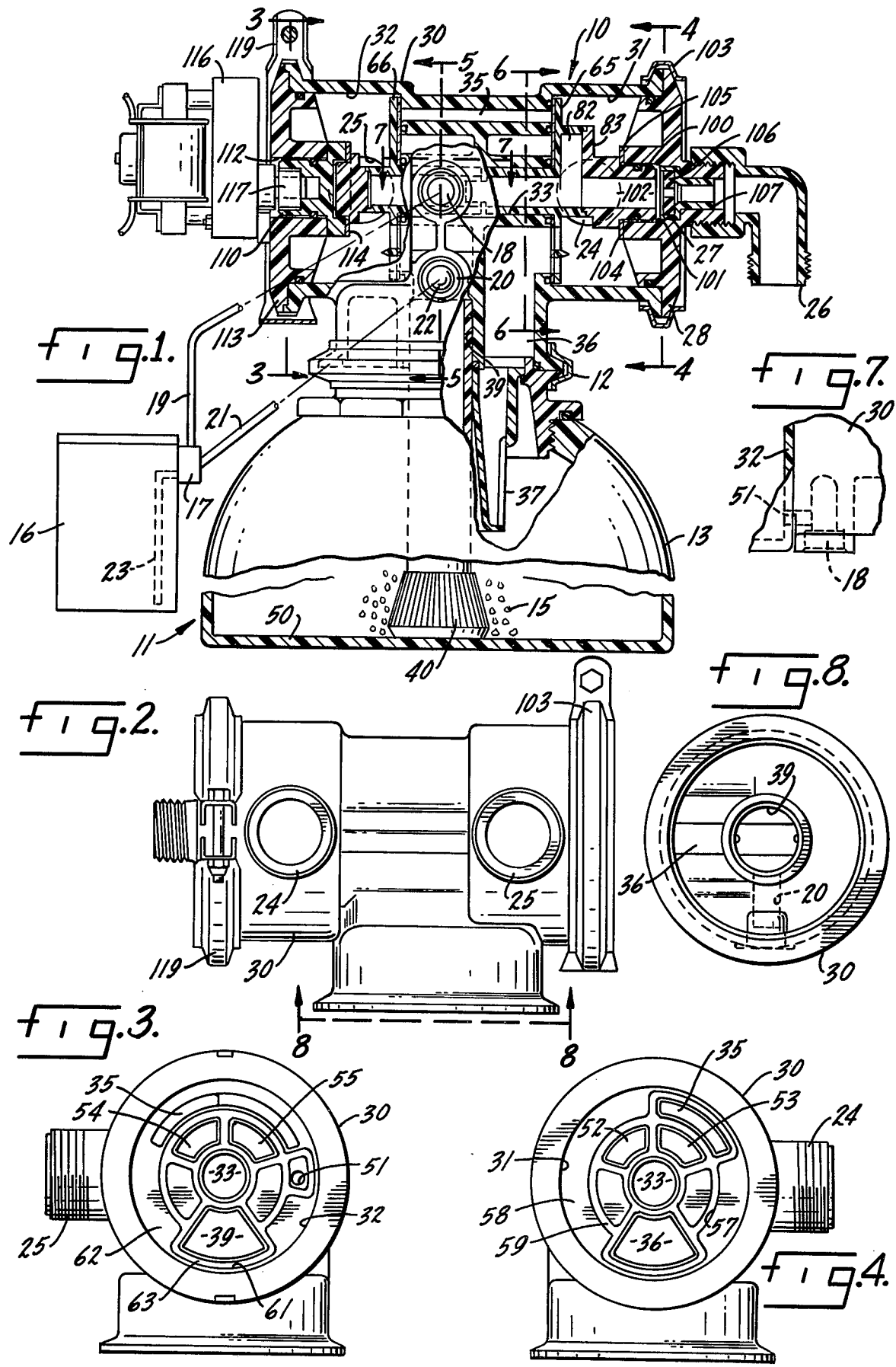

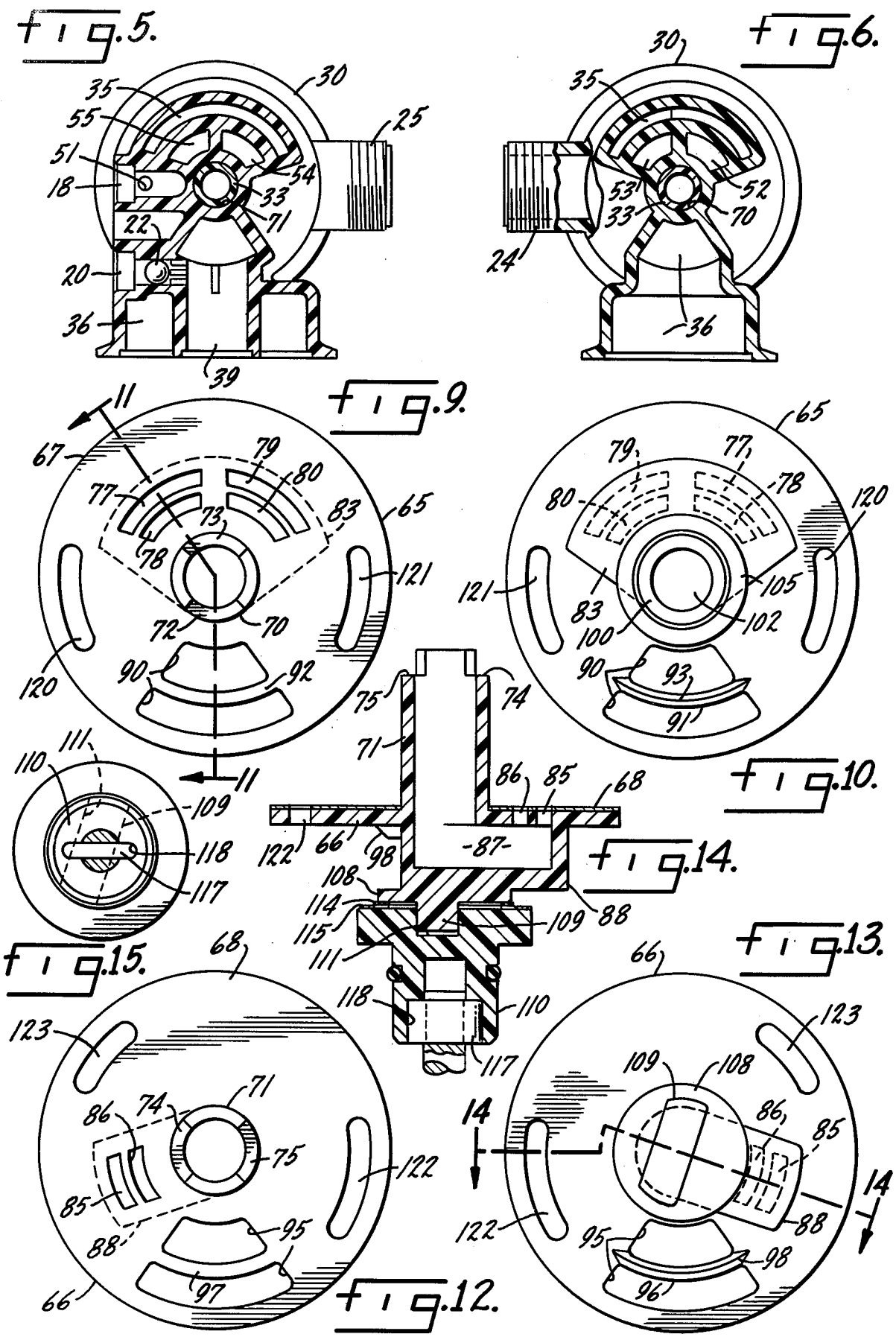

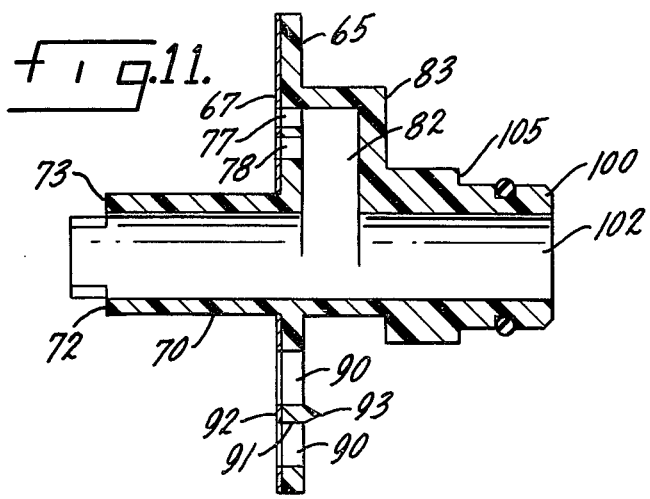
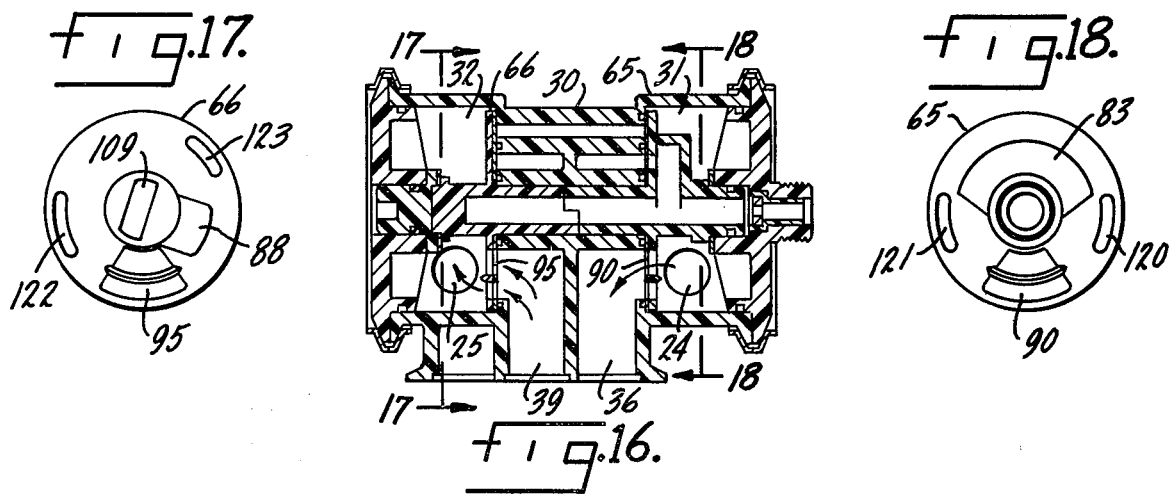
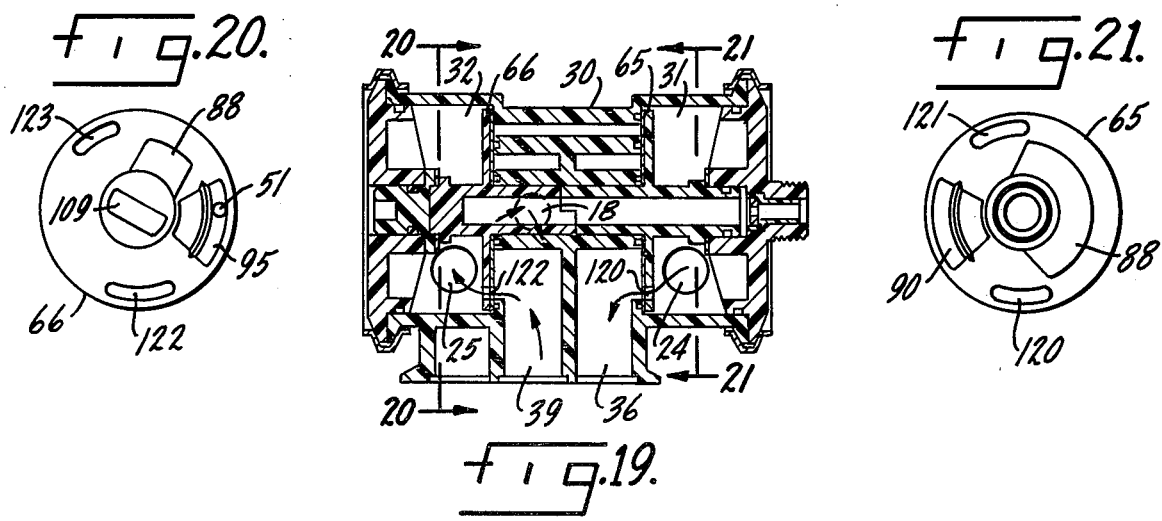

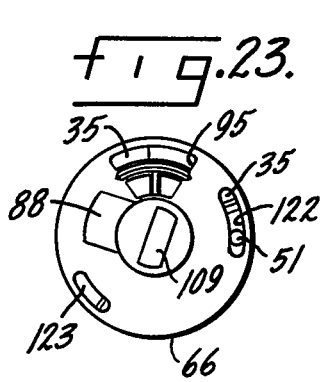
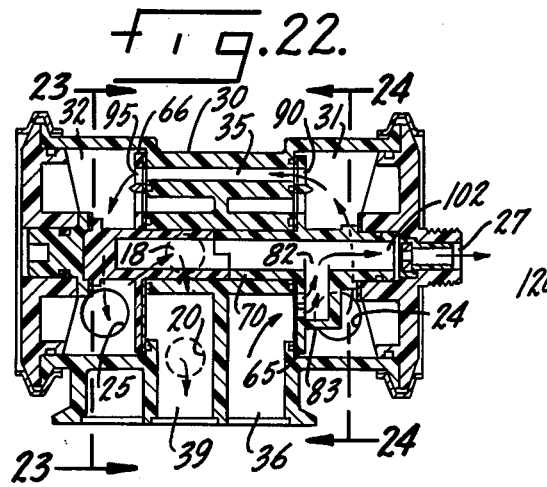
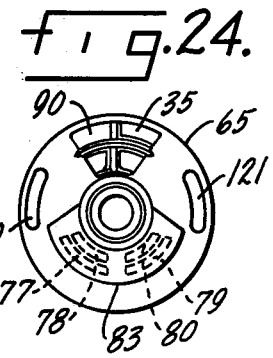
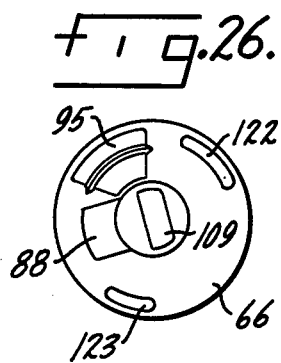
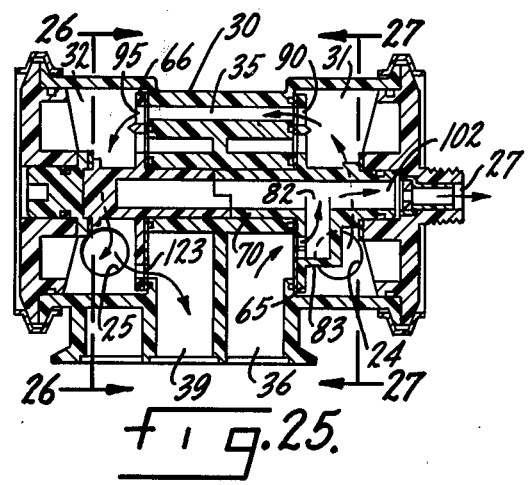
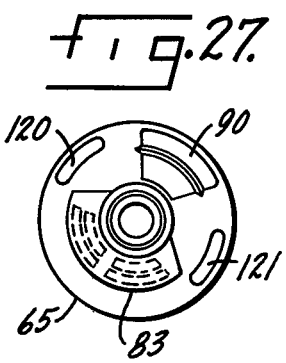
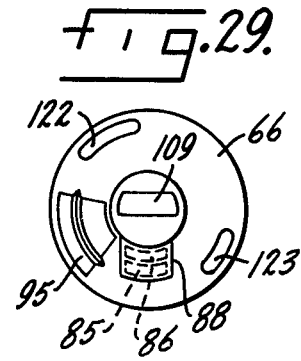
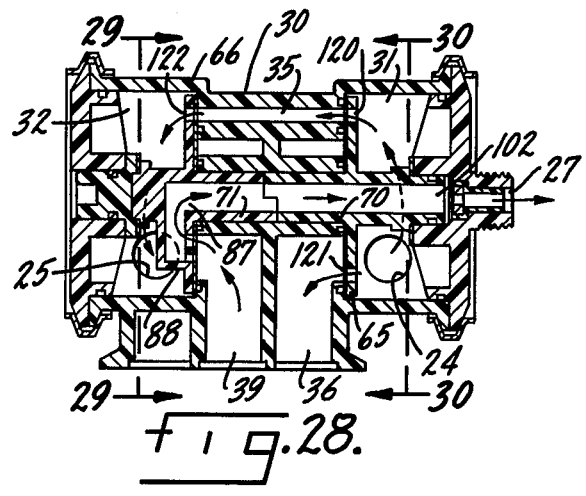
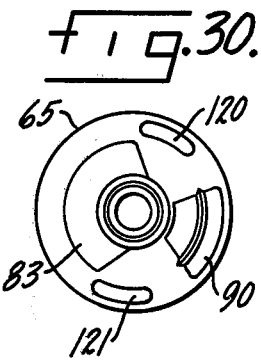

LIQUID TREATMENT APPARATUS

BACKGROUND OF THE INVENTION

This invention relates to multiple cycle liquid treatment apparatus and more particularly to an improved flow control valve that automatically starts and stops the different cycles.

Water softening apparatus using ion exchange resin particles must be regularly regenerated with brine in order to restore or maintain the water hardness removing capacity of the resin particles. The flow control valve for such apparatus must accurately control the volume and velocity of liquid flowing through the resin particles and the brining system during four or more cycles. Automatic water softening apparatus used in people's homes has to be capable of operating under a wide range of pressure, flow, and hardness conditions. Prior flow control valves usable under such a wide range of conditions were often unduly complicated and difficult to service because they had a large number of moving parts. Also, such prior valves were not capable of being used with different types of liquid treatment equipment, such as filters, requiring high flow rates during their backwash cycle.

OBJECTS OF THE INVENTION

Accordingly, it is an object of this invention to provide improved liquid treatment apparatus.

Another object is to provide a flow control valve usable with different types of multicycle liquid treatment apparatus such as domestic or commercial water softener units, and liquid filters.

Another object is to provide a liquid flow control valve capable of operating under a wide range of varying flow and pressure conditions.

Another object is to provide a multicycle liquid flow control valve with a reduced pressure drop for any specific flow volume.

Another object is to provide liquid treatment apparatus with a flow control valve having a small number of moving parts.

Another object is to provide a five cycle liquid flow control valve having a pair of rotatable slotted discs wherein essentially all components of the valve can be made by injection molding of plastic.

Another object is to provide a slotted rotatable disc for a liquid flow control valve that holds a gasket in its groove as a slot passes over the gasket during sudden increases in liquid flow or pressure.

Another object is to provide a multicycle liquid flow control valve for water treatment equipment that is durable, easy to repair and maintain, relatively low cost, and which does not possess defects found in similar prior art valves.

Other objects and advantages of the invention will be found in the specification and claims, and the scope of the invention will be pointed out in the claims.

DESCRIPTION OF THE DRAWING

FIG. 1 is a partially schematic, partially brokenaway front side view of liquid treatment apparatus in accord with this invention.

FIG. 2 is a back side view of the control valve shown in FIG. 1.

FIG. 3 is an end view of the inside of the valve housing taken along the line 3—3 in FIG. 1.

FIG. 4 is an end view of the inside of the valve housing taken along the line 4—4 in FIG. 1.

FIG. 5 is a cross-sectional view taken along the line 5—5 in FIG. 1.

FIG. 6 is a cross-sectional view taken along the line 6—6 in FIG. 1.

FIG. 7 is a broken-away top view taken along the line 7—7 in FIG. 1.

FIG. 8 is a reduced scale bottom view taken along the line 8—8 in FIG. 2.

FIG. 9 is an end view of a flow control disc.

FIG. 10 is an opposite end view of the disc in FIG. 9.

FIG. 11 is a cross-sectional view taken along the line 11—11 in FIG. 9.

FIG. 12 is an end view of another flow control disc.

FIG. 13 is an opposite end view of the disc in FIG. 12.

FIG. 14 is a cross-sectional view taken along the line 14—14 in FIG. 13.

FIG. 15 is a bottom view of the journal shown in FIG. 14.

FIG. 16 is a partially broken-away diagrammatic representation of the invention showing the liquid flow during the service cycle, with some parts omitted, and with the inlet and outlet ports lowered for simplification.

FIG. 17 is a schematic end view of the position of the disc taken along the line 17—17 in FIG. 16.

FIG. 18 is a schematic end view of the position of the disc taken along the line 18—18 in FIG. 16.

FIG. 19 is a diagrammatic representation as explained with regard to FIG. 16 showing the flow during the regenerant tank refill cycle, with a schematic representation of the regenerant liquid refill port.

FIG. 20 is a schematic end view of the position of the disc taken along the line 20—20 in FIG. 19.

FIG. 21 is a schematic end view of the position of the disc taken along the line 21—21 in FIG. 19.

FIG. 22 is a diagrammatic representation as explained with regard to FIGS. 16 and 19 showing the flow during the regeneration and slow rinse cycle, with a schematic representation of the regenerant liquid inlet port.

FIG. 23 is a schematic end view of the position of the disc taken along the line 23—23 in FIG. 22.

FIG. 24 is a schematic end view of the position of the disc taken along the line 24—24 in FIG. 22.

FIG. 25 is a diagrammatic representation as explained with regard to FIG. 16 showing the flow during the backwash cycle.

FIG. 26 is a schematic end view of the position of the disc taken along the line 26—26 in FIG. 25.

FIG. 27 is a schematic end view of the position of the disc taken along the line 27—27 in FIG. 25.

FIG. 28 is a diagrammatic representation as explained with regard to FIG. 16 showing the flow during the fast rinse cycle.

FIG. 29 is a schematic end view of the position of the disc taken along the line 29—29 in FIG. 28.

FIG. 30 is a schematic end view of the position of the disc taken along the line 30—30 in FIG. 28.

DESCRIPTION OF A PREFERRED EMBODIMENT

The drawing shows a liquid flow control valve 10 that automatically starts and stops the different cycles of conventional multiple cycle ion exchange domestic sized water softening apparatus 11. Valve 10 is attached by a clamp ring 12 to the top of a conventional pressure container 13 enclosing particles 15 of ion exchange resin. A conventional regenerant solution or brine tank 16 and aspirator suction nozzle 17 are connected to a regenerant liquid refill port 18 by a line 19 and to a regenerant liquid inlet port 20 by a line 21. A conventional spherical check valve 22 is in port 20. Tank 16 may contain one or more liquid flow pipes 23 and other conventional components, such as a float controlled shut-off valve (not illustrated). Valve 10 is connected to a pressurized source of hard water through an untreated liquid inlet port 24 and to a service supply conduit through a treated liquid outlet port 25. A nipple 26 communicating with a waste outlet port 27 in an end cap 28 of hollow valve housing 30 is used to connect valve 10 to a sewer line or other waste outlet.

Housing 30 has a first circular cavity 31 which includes port 24 at one of its ends, and a second circular cavity 32 which includes port 25 at its other end. Cavities 31 and 32 are axially aligned and are connected at their centers by a cylindrical channel 33. A passage 35 spaced radially outwardly from channel 33 connects cavities 31 and 32, the entrance to passage 35 in cavity 31 being only half as wide as its outlet into cavity 32. A first hole 36 in housing 30 connects cavity 31 to the inside of container 13 through a conventional perforated liquid distributor 37 at the top of the container, and a second hole 39 connects cavity 32 to the inside of container 13 through a conventional perforated liquid collector 40 that terminates on the bottom 50 of the container and is coaxial at its upper end with distributor 37. A right angled passage 51 in the side of housing 30 connects cavity 32 to regenerant liquid refill port 18. Blind passages 52 and 53 extend from cavity 31, and blind passages 54 and 55 extend from cavity 32, the sole function of such blind passages being to conserve the material from which housing 30 is made. An interconnected series 57 of grooves surrounds passage 35, channel 33, hole 36, and blind passages 52 and 53 in the end surface 58 of cavity 31, and a resilient unitary O-ring gasket 59 occupies the series of grooves. An interconnected series 61 of grooves surrounds passage 35, channel 33, hole 39, blind passages 54 and 55, and angled passage 51 in the end surface 62 of cavity 32, and a resilient unitary O-ring gasket 63 occupies that series of grooves.

The cavities, passages, holes, channel and ports in housing 30 are selectively interconnected by the position of various slots in a pair of separate, rotatable circular discs 65 and 66. Disc 65 has a flat smooth face 67 which seals against the surface 58 of cavity 31, and disc 66 has a corresponding flat smooth face 68 which seals against the corresponding surface 62 of cavity 32. Disc 65 has an open-ended, integral, hollow, circular, tubular projection 70 extending from its face 67, and disc 66 has a corresponding open-ended integral, hollow, circular, tubular projection 71 extending from its face 68. The end of projection 70 is notched at 72 and 73, and the end of projection 71 is notched at 74 and 75, and these notches mate so as to provide a slip-fit that enables projections 70 and 71 to be coupled to each other inside of channel 33. Projections 70 and 71 are axially aligned with each other and with waste port 27. Four slots 77, 78, 79 and 80 through face 67 of disc 65 are connected to the inside of projection 70 by a passageway 82 that is defined by a blister 83 extending above the opposite face of the disc and completely enclosing these slots. Two slots 85 and 86 through face 68 of disc 66 are connected to the inside of projection 71 by a passageway 87 that is defined by a blister 88 extending above the opposite face of the disc and completely enclosing these slots. A relatively wide slot 90 through disc 65 is spanned by a bridge 91 having a flat smooth surface 92 in the same plane as the disc face 67. The opposite surface of bridge 91 tapers to a sharp edge 93. A relatively wide slot 95 through disc 66 is spanned by a bridge 96 having a flat smooth surface 97 in the same plane as the disc face 68. The opposite surface of bridge 96 tapers to a sharp edge 98. Surface 92 of bridge 91 presses against the portion of gasket 59 surrounding hole 36 and prevents gasket 59 from being pulled out of groove 57 by sudden increases in liquid flow or pressure changes that occur as wide slot 90 passes over hole 36. Surface 97 of bridge 96 presses against the portion of gasket 63 surrounding hole 39 and prevents gasket 63 from being pulled out of groove 61 by sudden increases in liquid flow or pressure changes that occur as wide slot 95 passes over hole 39. Sharp edges 93 and 98 on the bridges divide the liquid flow in a way that minimizes turbulence.

A hollow circular journal 100 secured to blister 83 rotatably supports disc 65 in a bearing hole 101 of end cap 28 of housing 30. A circular hole 102 through journal 100 is axially aligned between projection 70 and waste port 27. End cap 28 is removably attached to housing 30 by a clamp ring 103. A thrust spring 104 compressed between a shoulder 105 on journal 100 and end cap 28 urges disc 65 against cavity surface 58. A conventional flow control washer 106 in an adaptor 107 occupies port 27. A drive adaptor 108 secured to blister 88 has a coupling bar 109 projecting from its outer surface. A circular journal 110 has a slot 111 in its inner face for receiving and coupling with bar 109. Journal 110 is rotatably received in a bearing hole 112 in end cap 113 of housing 30, and thus provides the support for disc 66. A thrust spring 114 compressed between a shoulder 115 on adaptor 108 and journal 110 urges disc 66 against cavity surface 62. A conventional automatic electric timer and motor assembly 116 turns a drive tang 117 in a predetermined time and rotational angle sequence. Tang 117 is received in a slot 118 in journal 110 and thus provides the force which rotates discs 65 and 66 in unison so as to selectively align various slots in each disc with, or to block, the cavities, channel, passages and holes for varying time periods during which the direction of liquid flow in the apparatus is changed and controlled. A clamp ring 119 holds end cap 113 on housing 30. O-rings should be employed in appropriately placed grooves to seal the joints of the parts of apparatus 11, and most components of valve 10 may be made by conventional injection molding of plastics such as partially glass-filled polyphenylene oxide.

Valve 10 will operate in the following manner to automatically control the liquid flow in apparatus 10 during a five cycle water softening sequence: During the service cycle, the discs 65 and 66 would be positioned essentially as shown in FIGS. 16–18. Slot 90 in disc 65 would be aligned with hole 36 in cavity 31 and slot 95 in disc 66 would be aligned with hole 39 in cavity 32. The other slots 120, 121 and slots 77–80 under blister 83 in disc 65 would not face any open liquid flow paths through cavity 31, and the other slots 122 and 123 and slots 85 and 86 under blister 88 in disc 66 would not face any open liquid flow paths through cavity 32. All of the hard water entering cavity 31 through port 24 leaves through slot 90 and enters distributor 37 through hole 36. The hard water is softened as it flows downwardly through the bed of ion exchange particles 15, and the soft water enters the lower end of collector 40 and flows up into cavity 32 through aligned hole 39 and slot 95. From cavity 32, the soft water flows to service through port 25.

The regenerant tank refill cycle is next, and during this cycle the discs 65 and 66 are rotated essentially to the positions shown in FIGS. 19-21. Slot 120 in disc 65 is aligned with hole 36, and none of the other slots in disc 65 would face an open flow path. Slot 122 in disc 66 is aligned with hole 39, and slot 95 is aligned with angled passage 51 leading to refill port 18 (indicated in phantom in FIG. 19). None of the other slots in disc 66 face an open flow path. Hard water entering through port 24 passes through aligned slot 120 and hole 36, and is then softened as described above. The soft water enters cavity 32 through aligned hole 39 and slot 122 and passes to service through port 25. Soft water in cavity 32 also flows through slot 95 into angled passage 51, then out through port 18 and through line 19 into regenerant tank 16. The volume of soft water flowing into tank 16 may be controlled in conventional manner by a float-controlled shut-off valve.

The regeneration and slow rinse cycle is next, and during this cycle the discs 65 and 66 are rotated to essentially the positions shown in FIGS. 22-24. Slots 77-80 beneath blister 83 on disc 65 are aligned with hole 36 and slot 90 is aligned with passage 35, but the other slots in disc 65 do not face any open flow path. Slot 95 in disc 66 is also aligned with passage 35 and slot 122 is aligned in part with angled passage 51 and in part with passage 35, but none of the other slots in disc 66 face any open flow path. Thus disc 66 blocks direct flow from cavity 32 to hole 39, and blister 83 on disc 65 blocks direct flow from cavity 31 into hole 36. Passageway 82 in blister 83 connects hole 36 to the inside of projection 70 and thus provides a flow path through hole 102 to waste port 27. Hard water in cavity 31 flows through slot 90 into passage 35 and then through slot 95 into cavity 32. During this cycle only hard water is available for service through port 25. Hard water from cavity 32 flows through angled passage 51, port 18 (indicated in phantom in FIG. 22) and line 19 to aspirator nozzle 17; this water flows through nozzle 17 and creates a suction that draws regenerant solution out of tank 16 in conventional manner. Since nozzle 17 is constricted, the volume of flow is relatively small. Hole 39 is in essence vented to atmospheric pressure through a path tracable in sequence through collector 40, container 13, distributor 37, hole 36, slots 77-80, passageway 82, projection 70, hole 102, and waste port 27; this unseats check valve 22 (as shown in FIG. 5) because port 20 is subjected to higher pressure through line 21. With port 20 open (as indicated in phantom in FIG. 22), the regenerant solution flows through line 21 and port 20 into hole 39, and then through collector 40 into the bottom of the bed of ion exchange particles 15. The regenerant solution passes slowly upwardly through the bed of particles 15 and restores their hardness removing capacity. The spent regenerant solution enters distributor 37 and flows into hole 36, and then through slots 77-80, passageway 82, projection 70, and hole 102 to waste port 27. From waste port 27, the spent regenerant solution flows to a sewer or other disposal destination. Flow control washer 106 in port 27 regulates the flow volume in conventional manner. After a predetermined volume of regenerant solution has been drawn out of tank 16, the conventional valving therein terminates regenerant solution flow to aspirator 17, but the flow of water from lines 19 and 21 continues to follow the path described above and thus slowly rinses the regenerant solution from the bed of particles 15 in container 13.

The backwash cycle is next, and during this cycle discs 65 and 66 are rotated to essentially the positions shown in FIGS. 25-27. The slots under blister 83 on disc 65 are still aligned with hole 36 and slot 90 is still aligned with passage 35, but the other slots in disc 65 do not face any open flow path. Slot 123 in disc 66 is aligned with hole 39 and slots 95 and 122 are aligned with passage 35, but the other slots in disc 66 do not face any open flow path. Blister 83 still blocks flow from cavity 31 to hole 36 and flow continues from cavity 31 through slot 90 into passage 35 and through slots 95 and 122 into cavity 32. Hard water is available to service through port 25, and a greatly increased volume of water flows from cavity 32 through slot 123 into hole 39 and then through collector 40 into the bottom of container 13. The greatly increased flow of backwash water disrupts the bed of particles 15 and tumbles them around in container 13; this vigorous action cleans the particles and dislodges foreign matter which is washed away with the dirty water in sequence through distributor 37, hole 36, passageway 82, projection 70, hole 102 and out through waste port 27.

The fast rinse cycle is last, and during this cycle discs 65 and 66 are rotated to essentially the positions shown in FIGS. 28-30. Slot 121 in disc 65 is aligned with hole 36 and slot 120 is aligned with passage 35, but the other slots in disc 65 do not face any open flow path. Slots 85 and 86 beneath blister 88 of disc 66 are aligned with hole 39 and slot 122 is still aligned with passage 35, but none of the other slots in disc 66 face any open flow path. Hard water from cavity 31 flows through slot 120 into passage 35 and through slot 122 into cavity 32, from which this water is available to service through port 25. A large volume of water from cavity 31 also flows through slot 121 into hole 36 and then into tank 13 through distributor 37; this water flows rapidly downwardly into collector 40 and thereby packs particles 15 into a tight bed in the bottom of tank 13 in addition to continuing to rinse the particles. From collector 40 the rinse water flows in sequence through hole 39 and slots 85 and 86 into passageway 87, projections 71 and 70, hole 102 and out through waste port 27. This completes the five cycle water softening process, so discs 65 and 66 are next rotated to the position shown in FIGS. 16-19 and the sequence begins again.

The direction, volume, and sequence of liquid flow in the treatment apparatus can be varied by changing the size and location of slots in the rotating discs 65 and 66 and the position and size of the passages, holes, ports, etc. in housing 30. Cycles can be added or eliminated in this manner. The volume and direction of liquid flow can be controlled so effectively that control valve 10 can be used with commercial sized water softeners and with liquid filters.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Multiple cycle liquid treatment apparatus comprising:
   (a) a container enclosing a liquid treating material;
   (b) a liquid flow changing control valve connected to said container, comprising a housing having a first circular cavity with an untreated liquid inlet port at one of its ends and a second circular cavity with a treated liquid outlet port at its other end, said cavities being axially aligned, a channel connecting the center of each cavity and a passage spaced radially outwardly from said channel also connecting said cavities, first and second holes in said housing respectively connecting said first and second cavities to the inside of said container;
   (c) a pair of separate, rotatable, slotted, circular discs, a first one of which is sealed against a surface of said first cavity, and a second one of which is sealed against a corresponding surface of said second cavity, and coupling means comprising hollow tubular means passing through said channel and connecting said discs to each other; and
   (d) timer controlled means for rotating said discs in unison so as to selectively align various slots in each disc with or to block said cavities, channel, passage and holes for varying time periods during which the direction of liquid flow in said apparatus is changed and controlled.

2. The invention defined in claim 1, wherein said housing has a regenerant liquid inlet port, a regenerant liquid refill port, and a waste outlet port.

3. The invention defined in claim 2, wherein said waste outlet port is axially aligned with and connected to said channel.

4. The invention defined in claim 2, further comprising an untreated liquid inlet distributor at one side of said liquid treating material, a treated liquid outlet collector at the other side of said liquid treating material, said inlet distributor being connectable through said first hole and first cavity to said inlet port, and said outlet collector being connectable through said second hole and second cavity to said outlet port, and a regenerant liquid tank, means connecting said tank to said regenerant liquid inlet port and to said regenerant liquid refill port.

5. The invention defined in claim 4, wherein during the service cycle of said apparatus said discs are rotated to a position in which a slot in said first disc is aligned between said first hole and said first cavity so as to permit untreated liquid in said first cavity to flow through said first hole into said inlet distributor, and a slot in said second disc is aligned between said second hole and second cavity so as to permit such liquid that has flowed through said material into said collector to flow through said second hole into said second cavity and out of said apparatus through said outlet port.

6. The invention defined in claim 5, wherein during the regenerant tank refill cycle of said apparatus, said discs are rotated to a position in which another slot in said second disc is aligned between said second cavity and said regenerant liquid refill port so that treated liquid flows from said second cavity through said refill port into said regenerant tank.

7. The invention defined in claim 4, wherein during the regeneration and slow rinse cycle of said apparatus, said discs are rotated to a position in which a slot in said first disc is aligned between said first cavity and said passage and a slot in said second disc is aligned between said second cavity and said passage and another slot in said second disc is aligned between said second cavity and said regenerant liquid refill port so that untreated liquid flows from said first cavity through said passage into said second cavity through said outlet port and through said refill port, and said regenerant liquid inlet port is connected to said second hole and is open so that regenerant liquid and rinse water flows through said collector into said material, and another slot in said first disc is aligned between said first hole and a passageway through said first disc having an open end communicating through said channel with said waste port so that spent regenerant liquid and rinse liquid flow into said distributor and then through said first hole and passageway and out said waste port.

8. The invention defined in claim 7, wherein during the backwash cycle of said apparatus said regenerant inlet port is closed and said discs are rotated to a position in which said other slot is moved out of alignment between said second cavity and said regenerant refill port and still another slot in said second disc is aligned between said second cavity and said second hole so that untreated liquid in said second cavity flows through said second hole into said collector and to said material.

9. The invention defined in claim 4, wherein during the fast rinse cycle of said apparatus said discs are rotated to a position in which a slot in said first disc is aligned between said first cavity and said passage and a slot in said second disc is aligned between said second cavity and said passage so that untreated liquid can flow from said first cavity through said passage into said second cavity and through said outlet port, and another slot in said first disc is aligned between said first cavity and said first hole, and another slot in said second disc is aligned between said second hole and a passageway in said second disc communicating through said channel with said waste port so that untreated liquid in said first cavity flows through said first hole into said distributor, and after fast rinsing said material flows through said collector into said second hole, passageway and channel, and out said waste port.

10. The invention defined in claim 1, wherein said coupling means comprises a tubular projection integral with one face of each disc and extending into said channel, and said projections are separably connected to each other in axial alignment.

11. The invention defined in claim 10, wherein said housing has a waste port and said projections are cylindrical, hollow, and open-ended, and are aligned with and provide liquid flow to said waste port.

12. The invention defined in claim 11, wherein each disc has a passageway connecting a slot in said face to its tubular projection so that each of said cavities is connectable to said waste port.

13. The invention defined in claim 1, wherein said surfaces of said first and second cavities comprise resilient gaskets in grooves in said surfaces, and each disc has a relatively wide slot with a bridge spanning said relatively wide slot for holding its gasket in its groove while said relatively wide slot passes thereover.

14. Water softening apparatus comprising:
   (a) a container enclosing a bed of ion exchange resin particles;
   (b) a water flow changing control valve connected to said container comprising a housing having a first circular cavity with a hard water inlet port at one of its ends and a second circular cavity with a soft water outlet port at its other end, said cavities being axially aligned, a circular channel connecting the center of each cavity and a passage spaced radially outwardly from said channel also connecting said cavities, first and second holes in said housing respectively connecting said first and second cavities to the inside of said container, a brine inlet port and a brine tank refill port communicating with said second hole, and a waste outlet port axially aligned with said channel;

(c) a pair of separate, rotatable, slotted, circular discs, a first one of which has a face sealed against a surface of said first cavity, and a second one of which has a face sealed against a corresponding surface of said second cavity, a hollow cylindrical tubular projection extending perpendicularly from the center of each disc into said channel, said projections coupling said tubes together, means connecting the inside of said projections to said waste outlet port, a hollow blister extending from the other face of each disc and completely covering a slot in each disc, said blister defining a passageway in each disc connecting its covered slot to the inside of said projection and thereby to said waste port; and (d) timer controlled means for rotating said discs in unison so as to selectively align various slots in each disc with or to block said cavities, channel, passage and holes for varying time periods during which the direction of water flow in said apparatus is changed and controlled.

15. A rotary disc valve comprising:

(a) a housing having a cylindrical cavity at each end, said cavities being axially aligned, a cylindrical channel connecting the centers of said cavities, a liquid flow opening in each cavity, and a liquid flow port in said housing axially aligned with said channel and isolated from said cavities.

(b) a pair of parallel, rotatable circular discs, each of which has a face sealed against a corresponding surface of one of said cavities, a hollow cylindrical tube extending perpendicularly from the center of each disc through said channel and coupling said discs to each other, means defining a passageway in each of said discs connecting said tube to a slot through said face of each disc;

(c) means for rotating said discs so that said slots are selectively aligned so as to communicate with said port through said tube.

16. The invention defined in claim 15, wherein said hollow cylindrical tube comprises a pair of tubular projections each of which is integral with one of said faces of said discs, and said projections are separably coupled to each other.

17. The invention defined in claim 16, wherein said passageways each comprise a hollow blister extending from the other face of each disc connecting the projection and slot of each disc.

18. An integral, circular disc valve body for use as a rotatable disc in a liquid flow control valve, said body having a flat smooth face with a cylindrical tubular projection extending perpendicularly therefrom at its center, and a hollow blister communicating with said projection and extending from its other face, there being a plurality of slots passing completely through said body and at least one other slot being completely covered by said blister so that said blister defines a passageway connecting said other slot and said projection.

19. The invention defined in claim 18, wherein said disc has a relatively wide slot and a bridge spans said wide slot, said bridge has a flat smooth surface in the same plane as the first mentioned face of said disc and the opposite surface of said bridge tapers to a sharp edge.

* * * * *